United States Patent
Tsypin et al.

[11] Patent Number: 5,980,168
[45] Date of Patent: Nov. 9, 1999

[54] HOLLOW CROWN DRILL

[75] Inventors: Nekhemian Tsypin; Vitalil Skalyga, both of Wuppertal, Germany

[73] Assignee: Hilti Aktiengesellschaft, Schaan, Liechtenstein

[21] Appl. No.: 08/978,400

[22] Filed: Nov. 25, 1997

[30] Foreign Application Priority Data

Nov. 26, 1996 [DE] Germany ............................ 196 48 868

[51] Int. Cl.$^6$ .................................................. B23B 41/02
[52] U.S. Cl. ............................ 408/204; 175/20; 175/244; 175/394; 175/403; 408/145; 408/207; 408/703
[58] Field of Search .................................... 408/204, 207, 408/703, 145; 175/20, 403, 394, 244

[56] References Cited

U.S. PATENT DOCUMENTS

| | | | |
|---|---|---|---|
| 1,456,983 | 5/1923 | Hansen | 175/244 |
| 3,095,049 | 6/1963 | Berger | 175/244 |
| 3,153,885 | 10/1964 | Keller et al. | 408/59 |
| 5,082,070 | 1/1992 | Obermeier et al. | 175/403 |
| 5,092,716 | 3/1992 | Omi | 408/59 |
| 5,281,060 | 1/1994 | Strange et al. | 408/204 |
| 5,388,655 | 2/1995 | Gruber | 175/394 |
| 5,451,126 | 9/1995 | Brun | 408/204 |
| 5,503,237 | 4/1996 | Neukirchen | 175/394 |

FOREIGN PATENT DOCUMENTS

| | | |
|---|---|---|
| 1321105 | 12/1989 | European Pat. Off. . |
| 0430536 | 6/1991 | European Pat. Off. . |
| 0739673 | 10/1996 | European Pat. Off. . |
| 2361987 | 3/1978 | France . |

OTHER PUBLICATIONS

International Application Publication WO/15683 Dec. 27, 1990.
Communication of Mar. 12, 1998, Application No. 97810755.5–2303–to applicant Hilti Aktiengesellschaft from European Patent Office, The Hague.

*Primary Examiner*—Daniel W. Howell
*Assistant Examiner*—Monica Smith
*Attorney, Agent, or Firm*—Brown & Wood, LLP

[57] ABSTRACT

A crown drill including a hollow cylindrical carrier body, which is formed of two coaxially arranged tubes connected with each other, and a cutting member attached to the carrier body and projecting axially beyond the leading end of the carrier body.

4 Claims, 1 Drawing Sheet

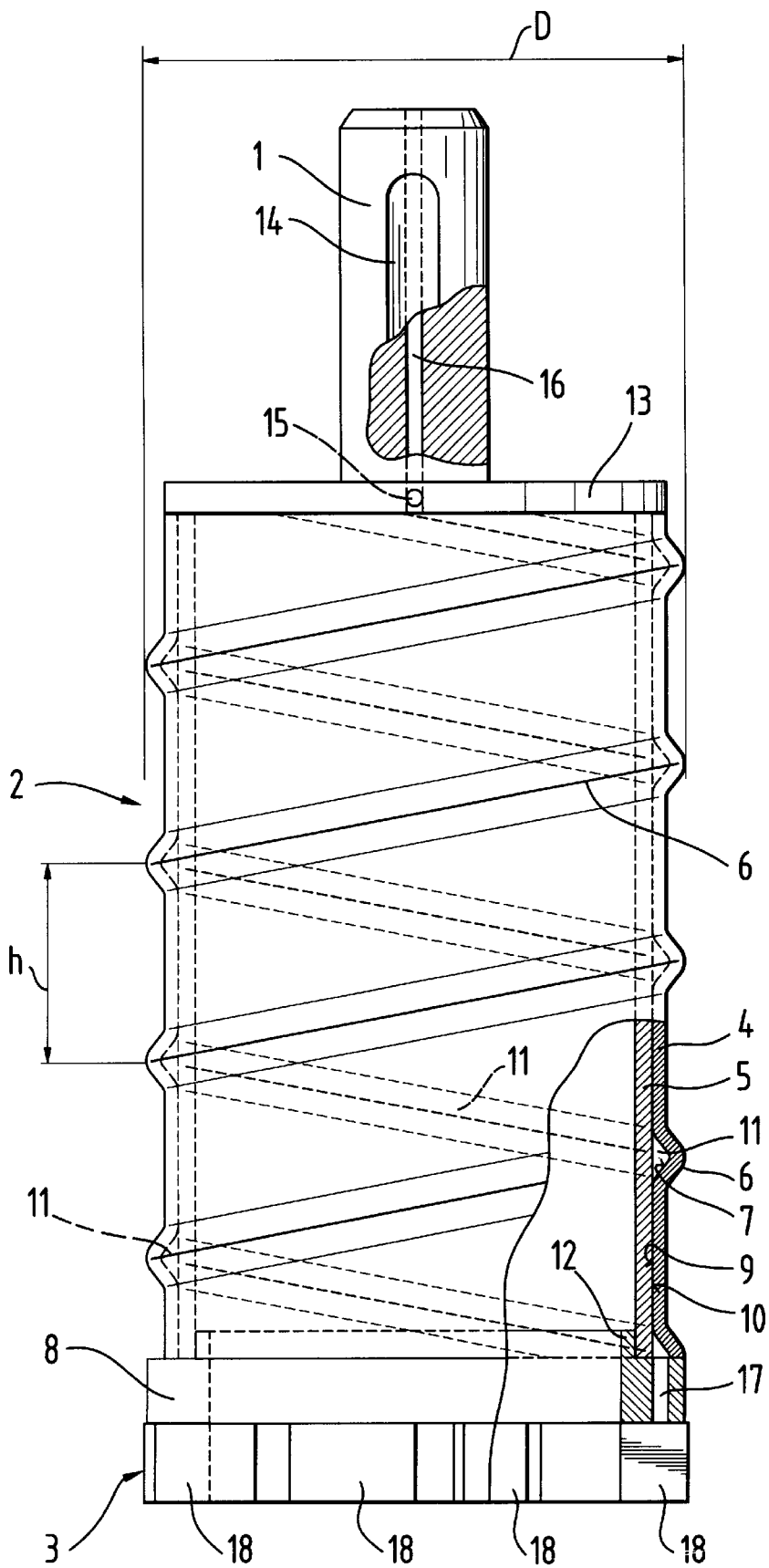

HOLLOW CROWN DRILL

SUMMARY OF THE INVENTION

1. Field of the Invention

The present invention relates to crown drills including a hollow carrier body and a cutting member projecting axially beyond the leading end of the hollow carrier body.

2. Description of the Prior Art

For forming bores in concrete, rock, masonry and the like, crown drills, which include a hollow cylindrical carrier body and at least one cutting member projecting axially beyond the leading end of the carrier body, are used. The advantage of using such crown drills consists in that only a hollow cylindrical recess is formed, and the remaining core can subsequently be easily broken. The work output, which can be achieved with such a drill, depends on the material of the ground or soil in which a bore is formed, on the drive power of the drilling machine with which the drill is used, and on the radial dimension of the cutting member.

German Laid-Open Application DE-OS 20 31 094 discloses a crown drill having a hollow cylindrical carrier body having a large wall thickness, and an annular cutting member provided at the leading end of the carrier body. In this drill, the cutting member, which extends radially beyond the carrier body, has a large cutting surface with which recesses, which have a large circular surface, can be produced. Because generally a large cutting surface adversely influences the drill feeding speed during forming bores in certain grounds and at a predetermined drive conditions, a rather poor work output can only be achieved with this drill.

Accordingly, an object of the present invention is to provide a crown drill with which a high work output can be achieved, which can be economically manufactured, and which would be characterized by a high rigidity and a small weight.

SUMMARY OF THE INVENTION

These and other objects of the present invention, which will become apparent hereinafter, are achieved by forming the hollow cylindrical carrier body of two tubes arranged coaxially with respect to each other and connected with each other.

Because the construction of the carrier body according to the present invention results in a very high rigidity, the wall thickness of the carrier body according to the present invention can be made very small in comparison with a conventional carrier body which is formed of a single tube. In this way, it becomes possible to reduce the radial dimension of the cutting member and thereby of its cutting surface. Because of the reduced cutting surface, the feed speed of the drill can be increased, which leads to a high work output when drilling a certain ground under the predetermined drive conditions.

In order to keep the radial dimension of the cutting member very small, advantageously the wall thickness of each tube is selected in a range from 0.1 mm to 2 mm. The small thickness of both tubes results in a very small weight of the entire drill.

From the manufacturing point of view, the connection of the two tubes is effecting by pressing one tube around the other tube, e.g., by contraction. When the contraction process for the connection of two tubes is used, the outer tube is heated before joining the two tubes or before placing the outer tube on the inner tube. When cooled, the outer tube shrinks about the inner tube.

The press connection can also be obtained by expansion. When expansion process for the connection of two tubes is used, the inner tube is cooled to such an extent that it can easily be inserted into the outer tube. For cooling the inner tube to a temperature of −190° C., a liquid nitrogen is used.

Another possibility for the press connection of the two tubes is obtained by linearly pressing an inner tube, which has, before being pressed-in, an outer diameter larger than the inner diameter of the outer tube, into the outer tube. After the pressing-in of the inner tube into the outer tube, an adhesive force, which was produced by material penetration into the conjugated surfaces, acts between the two tubes. This adhesive force provides for transmission of axial forces and rotational torques.

From the assembly point of view, the tubes can be advantageously connected by soldering, gluing, riveting, or welding.

For increasing the rigidity of the tubular carrier body, the outer tube is advantageously provided on its outer side with at least one partially helical rib extending along the entire longitudinal extent of the outer tube, the radial width of which does not exceed radially the outer contour of the cutting member.

In order to provide for discharge of drillings and/or drilling sludge from a hollow cylindrical recess, advantageously, the pitch of the helical rib is selected in a range from 0.1 to 1 times of the outer diameter of the carrier body.

At a greater pitch, at the predetermined circumferential speed of the carrier body, the drillings and the drilling sludge will be discharged from the recess very rapidly. To insure a constant discharge, the rib is provided with a constant pitch.

In order to keep the total weight of the drill low despite the provision of a rib on the outer side of the outer tube, advantageously, an at least partially helical indentation, which extends along the entire longitudinal extent of the inner tube, is provided on the inner side of the outer tube in the region of the rib.

The delivery of the cooling or flush water, which is necessary for a predetermined drilling process, can be effected through the drill. To this end, the hollow space, which is formed by the helical indentation provided on the inner surface of the outer tube and by the outer contour of the inner tube, is extended up to the cutting member.

In order to deliver the cooling or flush water from the hollow space in the leading end region of the tubular carrier body to the cutting member and/or into working region of the drill, the annular cutting member has, e.g., a slot extending parallel to a longitudinal extent of the tubular carrier body or substantially radially extending bores. The slot can extend along the entire height of the cutting member and is open at its bore-facing end. When the cutting member is formed of separate cutting segments, which are circumferentially spaced, the discharge of the cooling or flush water between the cutting segments becomes possible.

An easy and rapid exchange of the cutting body can be achieved by using an annular crown which can be arranged between the hollow cylindrical carrier body and the cutting member. The radial dimension of the crown at most corresponds to the radial dimension of the cutting member. The crown is connected with the carrier member and the cutting member by soldering.

BRIEF DESCRIPTION OF THE DRAWINGS

The features and objects of the present invention will become more apparent, and the invention itself will be best understood from the following detailed description of the preferred embodiment when read with reference to the accompanying drawings, wherein:

Single FIGURE of the drawings shows an elevational, partially cross-sectional view of a hollow crown drill according to the present invention.

DETAILED DESCRIPTION OF THE PREFERRED EMBODIMENTS

A hollow crown drill according to the present invention and shown in the drawing includes a shank 1, a hollow cylindrical carrier body 2, an annular crown 8, and a cutter member 3 which is formed of a plurality of separate cutting segments 18. The shank 1 extends from a flat bottom 13 and has a cylindrical shape. The shank 1 has a lock groove 14 which extends in a longitudinal direction of the tool and is closed at both of its ends. The lock groove 14 provides for axial securing of the drill in a tool holder of a drilling machine (not shown). The bottom 13 is fixedly connected with the hollow cylindrical carrier body 2 by soldering. The carrier body 2 is formed of two, coaxial thin-walled tubes 4 and 5 which are connected with each other by one tube being pressed around another tube. The two tubes 4 and 5 can also be connected with each other by rivets, glue, welding, soldering or clamping.

The annular crown 8 is secured to both tubes 4 and 5 at their leading end regions by soldering. The annular crown 8 serves as a replacement member on which the cutting segment 18 are secured. In case the cutting segments 18 wore out, the annular crown 8, together with the worn out cutting segments 18, is replaced with a new annular crown 8 with another set of cutting segments 18. The annular crown 8 has, at an end thereof facing away from the drilling direction, a band 12 which projects into the interior of the carrier body 2 or into the interior of the inner tube 5. In the embodiment of the crown drill shown in the drawings, the annular crown 8 projects beyond the outer diameter of the carrier body 2 in a radial direction. The inner diameter of the annular crown 8 is smaller than the inner diameter of the carrier body 2. The outer diameter of the band 12 substantially corresponds to the inner diameter of the carrier body 2 or the inner tube 5.

As it has already been mentioned above, the annular crown 8 is attached to the carrier body 2 by soldering.

The cutting segments 18, which form the cutting member 3, are soldered on the end face of the annular crown 8, facing in the drilling direction, flash with each other.

The band 12 of the annular crown 8 can, however, extend partially along the outer tube 4, with the inner diameter of the band 12 substantially corresponding to the outer diameter D of the carrier body 2 or the outer tube 4. Instead of the band 12, the annular bar crown 8 can be provided, e.g., with a slot into which the carrier body 2 or the two tubes 4 and 5 are inserted, with the annular crown 8 partially extending along the inner sides of the outer tube 4 and the inner tube 5.

The cutting member 3 or the cutting segments 18 can be provided directly on the carrier body 2, with the annular crown being eliminated. At that, the cutting members or the cutting segments 18 could have the same connection geometry as the annular crown 8 in order to facilitate their attachment to the carrier body 2.

In order to increase the rigidity of the carrier body 2, the outer tube 4 is provided, on its outer side, with an at least partially helical rib 6 extending along the entire longitudinal extent of the carrier body 2. At that, the rib 6 projects radially beyond the outer side of the outer tube 4 at most by an amount corresponding to the radial projection of the outer contour of the cutting segments 18 beyond the outer tube 4.

The helical rib 6, which serves for discharging of drillings and drilling sludge, has a constant pitch h.

In order to keep the total weight of the drill, despite the formation of the rib 6 on the outer side of the outer tube 4, small there is provided, on the inner side 9 of the outer tube 4 in the region of the rib 6, an at least partially helical indentation 7 which extends along the entire longitudinal extent of the inner tube 5. The indentation 7 forms, together with the outer side 10 of the inner tube 5, a hollow space 11 extending along the entire length of the carrier body 2.

The delivery of cooling or flushing water to the cutting segments 18, which is necessary during the drilling process, is effected through the hollow space 11 which communicates, in the region of the shank 1, via a connection bore 15 formed in the bottom 13, with a central bore 16 formed in the shank 1. In the region of the annular crown 8, the hollow space 11 opens into a through-bore 17 provided between two cutting segments 18.

The crown drill according to the present invention can be formed without a shank and can be connected with a tool holder of a drilling machine either by the inner tube or by the outer tube of the carrier body.

Though the present invention was shown and described in reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A crown drill, comprising a hollow cylindrical carrier body (2) having a front, in a drilling direction, face and an opposite rear face and formed of two tubes (4, 5), which are arranged coaxially with respect to each other and are connected with each other by one of the two tubes being pressed around another of the two tubes; a cutting member (3) fastened on the front face of the carrier body (2) and formed of a plurality of circumferentially spaced cutting segments; a bottom (13) connected to the rear face of the carrier body and extending perpendicular to the longitudinal axis of the drill; and a shank (1) secured to the bottom.

2. A crown drill, comprising a hollow cylindrical carrier body (2) having a front, in a drilling direction, face and an opposite rear face and formed of two tubes (4, 5), which are arranged coaxially with respect to each other and are unreleasably connected with each other by one of soldering, gluing, riveting, and welding; a cutting member (3) fastened on the front face of the carrier body (2) and formed of a plurality of circumferentially spaced cutting segments; a bottom (13) connected to the rear face of the carrier body and extending perpendicular to the longitudinal axis of the drill; and a shank (1) secured to the bottom.

3. A crown drill, comprising a hollow cylindrical carrier body (2) having a front, in a drilling direction, face and an opposite rear face and formed of two tubes (4, 5), which are arranged coaxially with respect to each other and are connected with each other; a cutting member (3) fastened on the front face of the carrier body (2) and formed of a plurality of circumferentially spaced cutting segments; a bottom (13) connected to the rear face of the carrier body and extending perpendicular to the longitudinal axis of the drill; and a shank (1) secured to the bottom, wherein an outer tube (4) is provided with an at least partially helical rib (6) extending radially outwardly along an entire longitudinal extent of the outer tube (4) and has, on an inner side (9) thereof in a region of the rib (6), an at least partially helical indentation (7) extending along an entire longitudinal extent of an inner tube (5).

4. A crown drill, comprising a hollow cylindrical carrier body (2) having a front, in a drilling direction, face and an opposite rear face and formed of two tubes (4, 5), which are arranged coaxially with respect to each other and are connected with each other; a cutting member (3) fastened on the front face of the carrier body (2) and formed of a plurality of circumferentially spaced cutting segments; a bottom (13) connected to the rear face of the carrier body and extending perpendicular to the longitudinal axis of the drill; a shank (1) secured to the bottom; and an annular crown (8) provided between the hollow cylindrical carrier body (2) and the cutting member (3).

* * * * *